(12) United States Patent
Zorzetto et al.

(10) Patent No.: US 8,814,091 B2
(45) Date of Patent: Aug. 26, 2014

(54) FLOOR MADE OUT OF COMPOSITE MATERIAL AND PROCESS FOR MANUFACTURING SUCH A FLOOR

(75) Inventors: Daniel Zorzetto, Cologne (FR); Jean-Christophe Lataillade, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 683 days.

(21) Appl. No.: 12/577,804

(22) Filed: Oct. 13, 2009

(65) Prior Publication Data

US 2010/0102169 A1    Apr. 29, 2010

(30) Foreign Application Priority Data

Oct. 16, 2008  (FR) ...................................... 08 57048

(51) Int. Cl.
*B64C 1/18* (2006.01)
*B21D 53/92* (2006.01)

(52) U.S. Cl.
USPC .......................................... 244/119; 428/188

(58) Field of Classification Search
USPC ............... 244/117 R, 118.1, 118.2, 119, 120; 52/783.17, 783.18, 793.1, 793.11; 108/56.1, 56.3; 428/55, 188, 122, 192, 428/99
See application file for complete search history.

(56) References Cited

U.S. PATENT DOCUMENTS

| | | | | |
|---|---|---|---|---|
| 3,361,401 A | * | 1/1968 | Hanifan | 410/156 |
| 3,732,138 A | * | 5/1973 | Almog | 428/114 |
| 3,769,767 A | * | 11/1973 | Scott | 52/145 |
| 3,918,289 A | * | 11/1975 | Oswald et al. | 72/439 |
| 4,051,289 A | * | 9/1977 | Adamson | 428/113 |
| 4,223,053 A | * | 9/1980 | Brogan | 428/34.5 |
| 4,479,621 A | | 10/1984 | Bergholz | |
| 4,931,340 A | * | 6/1990 | Baba et al. | 428/73 |
| 5,223,067 A | | 6/1993 | Hamamoto et al. | |
| 5,537,935 A | * | 7/1996 | Otaguchi et al. | 108/51.3 |
| 5,547,737 A | * | 8/1996 | Evans et al. | 428/178 |
| 5,600,930 A | * | 2/1997 | Drucker | 52/585.1 |
| 5,690,035 A | * | 11/1997 | Hatayama et al. | 105/452 |
| 5,794,402 A | * | 8/1998 | Dumlao et al. | 52/783.17 |
| 5,806,264 A | * | 9/1998 | Boot | 52/415 |
| 5,850,722 A | * | 12/1998 | Yasui | 52/793.11 |
| 5,914,175 A | * | 6/1999 | Nudo et al. | 428/178 |
| 6,070,378 A | * | 6/2000 | Dumlao et al. | 52/263 |
| 6,467,118 B2 | * | 10/2002 | Dumlao et al. | 14/73 |

(Continued)

FOREIGN PATENT DOCUMENTS

DE    31 41 869 A1    5/1983
EP    1 445 178 A     8/2004

(Continued)

OTHER PUBLICATIONS

French Search Report and Written Opinion dated Jun. 26, 2009.

*Primary Examiner* — Joseph W Sanderson
(74) *Attorney, Agent, or Firm* — Greer, Burns & Crain, Ltd.

(57) ABSTRACT

A floor can be attached to a vertical frame structure of a vehicle and includes a horizontal boxed structure having a plurality of boxes positioned side by side to form a continuous, uniform upper surface and lower surface, with the upper surface covered with an upper skin and the lower surface covered with a lower skin and means of attachment to attach the boxed structure laterally to the frame structure.

11 Claims, 3 Drawing Sheets

(56) References Cited

U.S. PATENT DOCUMENTS

| | | | |
|---|---|---|---|
| 6,743,504 B1* | 6/2004 | Allen et al. | 428/362 |
| 6,746,755 B2* | 6/2004 | Morrison et al. | 428/166 |
| 6,759,114 B2* | 7/2004 | Wu et al. | 428/178 |
| 7,194,846 B2* | 3/2007 | Swiszcz et al. | 52/793.11 |
| 7,207,151 B2* | 4/2007 | Swiszcz et al. | 52/793.11 |
| 7,322,299 B2* | 1/2008 | Greene | 108/56.1 |
| 7,475,850 B2* | 1/2009 | Vetillard et al. | 244/117 R |
| 7,775,478 B2* | 8/2010 | Wood et al. | 244/119 |
| 2002/0034612 A1* | 3/2002 | Knutson | 428/188 |
| 2003/0059577 A1* | 3/2003 | Morrison et al. | 428/166 |
| 2003/0072920 A1* | 4/2003 | Klinger | 428/188 |
| 2005/0160949 A1* | 7/2005 | Greene | 108/56.1 |
| 2008/0078129 A1 | 4/2008 | Wood et al. | |
| 2009/0255213 A1* | 10/2009 | Schwartau | 52/794.1 |

FOREIGN PATENT DOCUMENTS

| | | |
|---|---|---|
| FR | 1 578 022 A | 8/1969 |
| FR | 2 879 998 A | 6/2006 |
| WO | 82/00974 A | 4/1982 |
| WO | 2005/037597 A | 4/2005 |

* cited by examiner

FLOOR MADE OUT OF COMPOSITE MATERIAL AND PROCESS FOR MANUFACTURING SUCH A FLOOR

This application claims priority to French Application No. 08 57048 filed 16 Oct. 2008, the disclosure of which is incorporated herein by reference in its entirety.

The disclosed embodiments concern a floor made out of composite material for a transport vehicle, particularly an aircraft. It also concerns a process for manufacturing such a floor.

The disclosed embodiments have applications in the field of passenger or freight transportation, such as trains, heavy trucks and aircraft. It has applications particularly in the field of aeronautics, where aeronautical engineers are constantly trying to reduce the total weight of the vehicle.

BACKGROUND

In the field of passenger or freight transportation, particularly in the field of aeronautics, vehicle manufacturers are trying to reduce the weight of the vehicles, while making them highly resistant. To do so, they are trying to replace the metal structure of the vehicles, at least in part, with a light or lighter structure.

Particularly in the field of aeronautics, the aircraft structure is generally made from metal panels, assembled with fastening systems that are also metal. In particular, the floors of the aircraft are made of a horizontal metal structure attached to a vertical frame structure that is also metal. The horizontal structure is generally composed of metal spars and cross beams, made of aluminum or other alloys, for example. This horizontal structure is attached to the metal frames placed on either side of the aircraft fuselage that comprise the frame structure of the aircraft.

In the case of passenger transportation, the horizontal structure also includes rails for the seats or other cabin fixtures. The rails are metal, and the passenger seats and most cabin fixtures are attached to them, specifically for transporting freight or passengers, like galleys, toilets, partitions, etc. These rails are perpendicular to the cross beams. They either placed on the cross beams, or across them. In aircraft used to transport passengers, at least two rails are mounted in the floor, spaced apart and running longitudinally from the front of the aircraft to the back. Chassis, each of which has two or more seats, are attached to these rails to form a bay of armchairs. Other elements of the cabin fixtures are attached to these same rails.

The horizontal structure made in this way is covered with floor panels placed on the rails. In effect, the unit made up of the rails and cross beams is an approximately plane but not uniform surface. Floor panels are therefore necessary to make this surface continuous and uniform, in order to ensure the safety of the passengers and crew when they move around onboard the aircraft.

Such floors are relatively cumbersome due to the fact that the different elements of which they are composed are superimposed on top of one another. Also, with such floors, the position of the rails is not very flexible: the rails are placed in the floor and can no longer be moved without totally changing the floor.

Moreover, to best preserve the volume of the passenger cabin and that of the cargo compartment, the different wires in the aircraft (electric cables, hydraulic hoses, air conditioning pipes and other means of transferring energy) are installed in the interior of the cross beams. In other words, a large part, or even all of the electric wiring runs inside the cross beams in the floor of the aircraft to limit the space necessary for them to go through. Now, the fact that this wiring is placed inside the cross beams makes it hard to install, on one hand, and delicate to replace, on the other. Indeed, in a traditional metal structure, to replace the wiring it is necessary to take the floor apart, at least partly, to remove the existing wiring and then replace it with the new, which must be passed through different cross beams.

In general, aircraft with metal structures have the disadvantage of being heavy. To reduce the structural weight of the aircraft, aeronautics manufacturers are trying to replace certain metal elements with elements made of composite material. Indeed, since composite materials have the advantage of being relatively light compared to metal, the total weight of an aircraft with a composite structure is significantly lighter than that of an aircraft with a metal structure.

It is therefore conceivable to replace the current metal floors with floors made of composite materials with the same structure. However, even if such floors made it possible to save weight, they would not make it possible to fix the disadvantages of the current floors described above (cumbersome, inflexible rail position, hard to install and replace wiring).

SUMMARY

The goal of the disclosed embodiments is to remedy the disadvantages of the techniques just described by proposing a floor made, at least partly, of composite materials. To do so, the floor in the disclosed embodiments has a boxed structure, made out of composite materials. This boxed structure is composed of a combination of boxes made of composite materials placed side by side to form a continuous uniform surface. This boxed structure is mounted on a beam that is itself attached to the aircraft frame structure.

More specifically, the disclosed embodiments concern a floor for a transport vehicle that can be attached to a vertical frame structure of said vehicle, characterized by the fact that it includes:

a boxed horizontal structure further comprising a plurality of boxes positioned side by side, forming a continuous, uniform upper and lower surface, with the upper surface covered with an upper skin and the lower surface covered with a lower skin and
  means of attaching the boxed structure laterally to the frame structure.

The floor in the disclosed embodiments can include one or more of the following characteristics:
  the boxed structure is made of composite material.
  the means of attachment include a longitudinal beam to hold the boxed structure and beam attachment brackets on the frame structure,
  the longitudinal beam has a C profile,
  the longitudinal beam is made of a composite material,
  the brackets provide pivot connections between the boxed structure and the frame structure,
  the brackets are made of a composite material,
  the means of attachment include vertical support rods.

The disclosed embodiments also concern a process for manufacturing such a floor. This process is characterized by the fact that it includes the following operations:
  fabricating boxes made of composite materials,
  assembling the boxes side by side to form at least one continuous, uniform upper surface,
  applying an upper skin and a lower skin made of composite material to the boxes assembled in this way,
  joining the boxes and the upper and lower skins to form a boxed structure, installing the boxed structure in at least one longitudinal beam with a C profile, attaching longitudinal beams on the vertical frame structure of the vehicle.

The disclosed embodiments also concern an aircraft further comprising a floor like the one described above.

DETAILED DESCRIPTION

Figure 1:
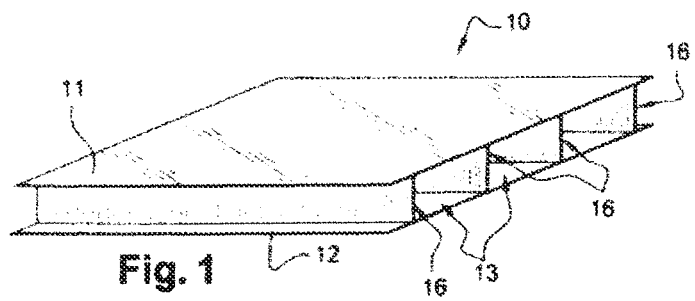
FIG. 1 shows a general view of a floor made of composite material according to the disclosed embodiments.

FIG. 1 shows a perspective view of the horizontal boxed structure of a floor made of composite material in the disclosed embodiments. This floor structure 10 has an upper skin 11 and a lower skin 12. Between the lower skin 12 and the upper 11 skin, it has a plurality of boxes 13 positioned side by side.

Figure 2A:
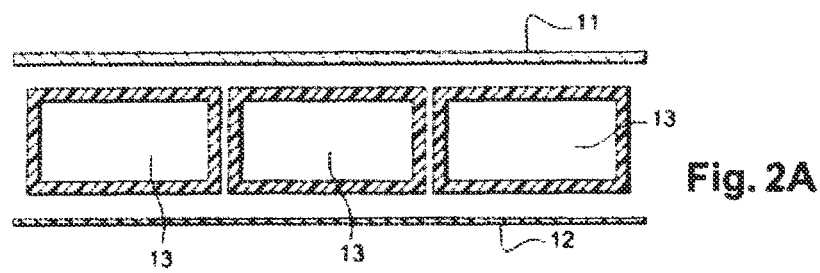
FIGS. 2A and 2B show front views, exploded sections and cross sections of the floor in FIG. 1.
Figure 2B:
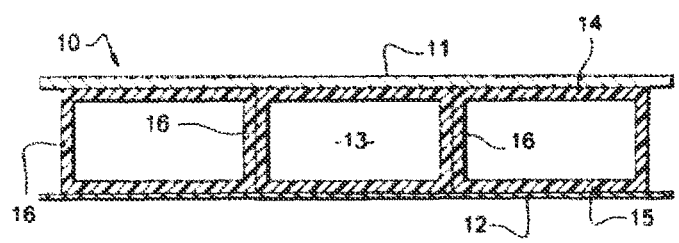

FIGS. 2A and 2B show an example of the boxed structure in the disclosed embodiments. FIG. 2B shows a front view of the boxed structure 10. FIG. 2A shows the boxed structure 10 made from several boxes 13 positioned side by side. One box is a structural element whose cross section has completely closed working contours. Each box 13 consists of a basic tube, made of composite material, with a square or rectangular cross section, placed horizontally, parallel to the surface of the floor. Each box is thus oriented so that its length is in the horizontal direction.

Each box made of composite material can be made from laps of dry fibers, pre-coated with a thermosetting resin. The precoated fiber laps are placed in a square or rectangular mold. They are then heated, which makes the resin polymerize so the fiber reinforcement can take the shape of the mold. After it cools, the mold is removed, producing a box 13 with a square or rectangular cross section, depending on the shape of the mold.

A plurality of boxes, all identical, is made in this way.

The boxes can be one-piece. In this case, each box has a predetermined width and length corresponding to the width of the floor. In other words, the length of the box corresponds approximately to the transverse dimension of the aircraft fuselage.

The boxes can also have several pieces. If so, two or more boxes are placed in a row, with beams providing a mechanical link between each group of boxes.

The plurality of identical boxes made in this way is placed side by side and then assembled. Assembling of the boxes 13 in this way, as shown in FIG. 2B, forms an element with plane surfaces. Specifically, it forms an upper plane surface 14 and a lower surface 15, also plane. These upper 14 and lower 15 surfaces are continuous and uniform. In other words, these surfaces 14 and 15 for mounting the boxes 13 have no irregularities or protrusions, either on the boxes or where two boxes meet. As will be seen below, the fact that the upper surface 14 is continuous and uniform makes it possible to place the rails of the seats at any point on the surface, which provides great flexibility in arranging the cabin.

The boxes 13 mounted in this way form transverse partitions 16, also called transverse warps, where they meet.

To join the boxes 13 to one another, an upper skin 11 and a lower skin 12 are placed, respectively, on the upper surface 14 and lower surface 15 of the box assembly. The transverse warps 16 then connect the upper skin 11 and the lower skin 12.

The upper skin 11 reinforces the continuity and uniformity of the upper surface 14. Along with the lower skin 12, it attaches different boxes 13 together and makes it possible to install rails for the seats or for the cabin arrangement. Preferably, the lower and upper skins are each made of one piece so that the boxed structure is covered on each face with a single skin.

The upper skin 11 and the lower skin 12, like the partitions between the boxes, can have thicknesses with different dimensions depending mainly on the type of aircraft and the type of transport planned for the aircraft. Similarly, the cross section of the boxes 13 can be square or rectangular, with different dimensions depending on the total thickness of the floor. In the disclosed embodiments, the formation of the boxed structure is independent of the frame structure; in other words, the number of boxes and the dimensions of those boxes are independent of the frame structure and particularly the number of frames forming said frame structure. The number of warps in the boxed structure does not therefore correlate with the number of frames.

The boxes 13, along with the upper skin 11 and the lower 12 skin, form the boxed structure 10 of the floor in the disclosed embodiments. The continuity of the upper skin 11 of the boxed structure makes it possible to dispense with the presence of floor panels. It also offers the possibility of attaching the rails at all points on the surface. And it allows the rails to be installed after manufacture, even after the floor is installed in the fuselage. It is therefore possible to install the rails at places chosen and defined later, after the floor is manufactured.

As explained before, the horizontal boxed structure 10 of the floor 1 in the disclosed embodiments can be made by a process using composite materials, from laps of precoated dry fibers. It can also be made by a vacuum injection process called the resin transfer molding process or by a liquid resin process, an infusion process or any other known process for making elements out of composite materials.

The tubes forming the boxes can be obtained by draping laps of fibers, by winding, by pultrusion or by any other known process for placing fibers in molds.

The upper skin 11 and the lower skin 12 are draped on the box assembly either manually or by means of an automatic machine.

In one embodiment of the disclosed embodiments, the boxes are manufactured separately and then put together, along with the lower and upper skins, by gluing. This assembly of the boxes and skins can also be done by simultaneous polymerization of all parts. In this case. the different boxes are polymerized with one another, and the lower and upper skins are polymerized on the box assembly.

To make an aircraft floor, the boxed structure made in this way must be attached to the aircraft fuselage frame structure. This frame structure can be metal or made of a composite material. Whatever the frame structure, the boxed structure is attached laterally to said frame structure, thus forming the floor of the aircraft.

Figure 3:
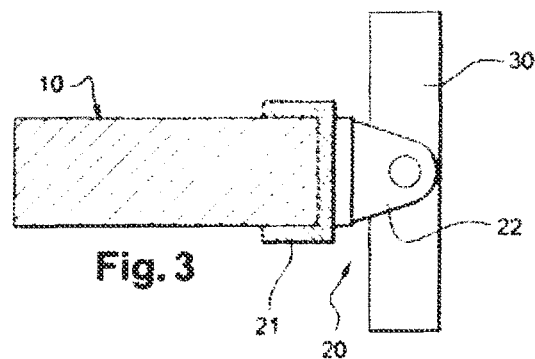
FIG. 3 shows a schematic view of a floor attached to an aircraft fuselage frame structure.

This attachment is done using means of attachment that include at least one longitudinal beam of the boxed structure and fittings for connecting the beam to the frame structure. A schematic example of these means of attachment is shown in FIG. 3. As can be seen in FIG. 3, the boxed structure 10 is nested in a longitudinal beam 21, itself attached to the frame structure 30 of the fuselage by fittings 22.

Figure 4:
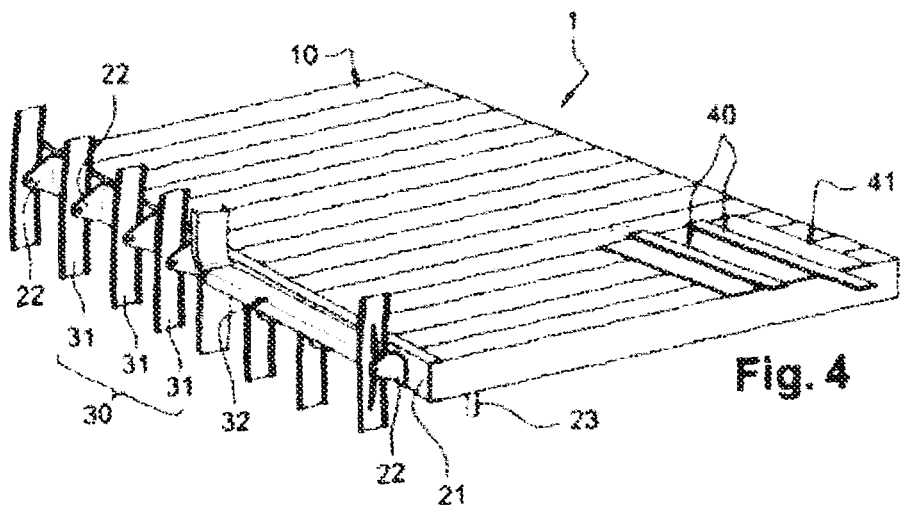
FIG. 4 shows a profile view of the floor in the disclosed embodiments mounted on the aircraft fuselage frame structure.

FIG. 4 shows a more detailed example of the floor 1 in the disclosed embodiments. As can be seen in this figure, the longitudinal beam 21 has a C-shaped profile. This beam 21 or C profile is nested around a lateral edge of the boxed structure 10, forming a closure of said structure. This beam 21 can be metal, made from a spun profile, folded sheet metal, etc. or composite material, according to one of the composite processes cited above.

The beam 21 is attached to the fuselage frame structure 30 by means of a plurality of connecting fittings 22. Preferably a connecting fitting 22 is installed between each frame 31 of the frame structure 30 and the beam 22. However, the number of fittings can be independent of the number of frames. Each fitting 22 constitutes a mechanical link between the boxed structure 10 and the aircraft fuselage. The example in FIG. 4 shows a space 32 in the frame structure 30 where the frames 31 are cut to the size of the beam 21. This space 32 is a port of entry area for passengers. Other spaces 32 can be installed in the fuselage frame structure 30, for example, for emergency doors in the case of passenger transport or bay doors in the case of freight transport.

The example in FIG. 4 shows a single longitudinal beam. It is understood that at least one second beam is installed on the opposite edge of the floor 1, in order to attach the boxed structure at least to both lateral sides of the fuselage.

The example in FIG. 4 shows an example of a seat rail on the boxed structure 10. In this example, rails 40 for attaching seats are mounted on a floor covering 41, such as carpet, then attached in the boxed structure 10. It is understood that the rails can be installed on the floor after attaching the boxed structure in the aircraft. In this way, the attachment rails 40 can be installed at particular places, specific to each aircraft. It is understood, of course, that the attachment rails 40 can also be mounted on the floor before it is installed in the aircraft, for example, for the purpose of mass production. It is also understood that these attachment rails 40 can be removed and then remounted, for example, to be moved, based on the specific needs of the aircraft.

Figure 5:
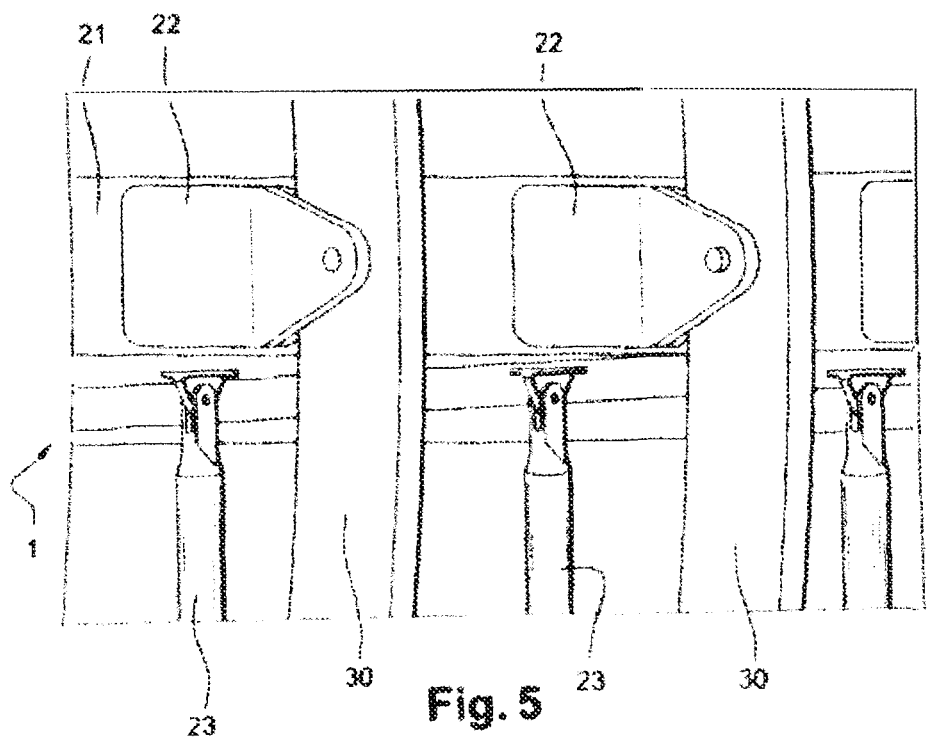
FIG. 5 shows the means of attaching the boxed structure to the aircraft frame structure.

FIG. 5 shows a side view of the floor in the disclosed embodiments, attached to the aircraft frame structure. This FIG. 5 shows, in particular, the connecting fittings 22 between the floor 1 and the frames 31 of the frame structure 30. It is understood that these fittings 22 form pivot connections with the frames 31 of the fuselage. These pivot connections make it possible to limit the bending moment in the frame structure 30 and the torque in the beam 21. As for the beam 21, the fittings 22 can be made out of metal or composite material; for example, metal fittings can be used when the beam 21 is metal, and fittings 22 made of composite material when the beam 21 is made of composite.

Depending on how they are made, the fittings 22 can be screwed, riveted, glued or attached by any other process of attachment, to the beam 21 and the frames 31.

FIG. 5 also shows that the means of attaching the boxed structure 10 to the frame structure 30 can also include supporting rods 23, placed under the boxed structure. These supporting rods 23 reinforce the attachment of the boxed structure. They make it possible to limit the bending torque in the boxed structure in order to provide support for said boxed structure.

The means of attachment, as they were just described, have the advantage of optimizing the boxed structure independently of the position of the frames in the frame structure.

Figure 6:
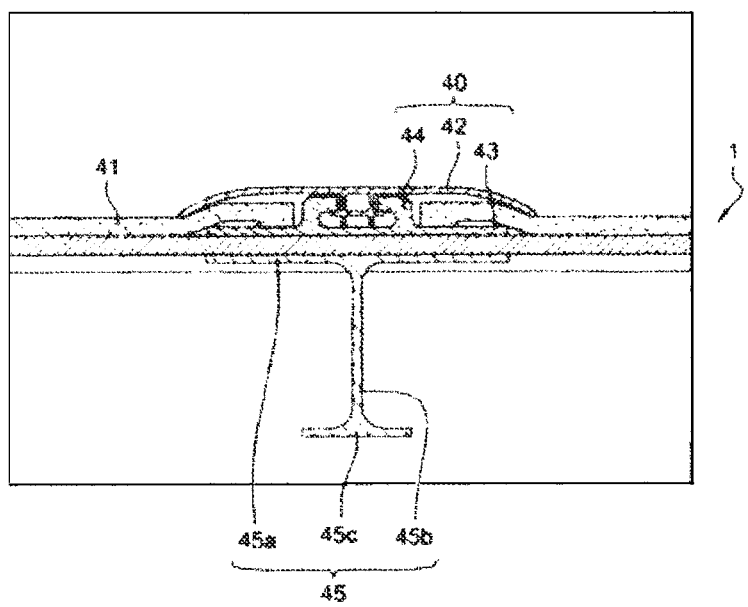
FIG. 6 shows an example of a rail installed in the floor, according to the disclosed embodiments.

FIG. 6 shows an example of installation of a rail 40 for attaching seats or arranging the cabin, in the floor 1 of the disclosed embodiments. As explained earlier, the attachment rail 40 is mounted on the boxed structure of the floor 1. The carpet 41, or other floor covering, is placed on both sides of the rail so as to cover the base 43 of said rail while leaving the slide 44 of the rail on the surface. Thus, the slide 44 remains easily accessible to hook on a seat or other cabin equipment, while the base 43 is hidden to make it easier for the passengers to move about. A rail cover 42 can then be placed above the rail 40 unit, particularly at places where there is neither a seat nor any cabin equipment, for these same reasons of safe passenger movement.

As shown in FIG. 6, screw-holder plates 45 can be inserted in the floor 1 to improve the attachment of the rails 40. These screw-holder plates 45 are T-shaped, and the top part 45a of the T is placed between the assembly of boxes and the upper skin 11, and the leg 45b of the T is inserted inside the boxes. The T of the screw-holder plate can have a foot 45c to improve the hold of the plate inside the box assembly. These screw-holder plates have the job of reinforcing the area of the boxed structure to which the rail 40 is attached. As shown in FIG. 6, the rail 40 is attached in the box structure, facing a screw-holder plate. The screw-holder plates are installed in the floor through orifices made in the lower skin 12 of the floor.

This screw-holder plate 45 can be self-stiffening in order to further improve the flexural hold of the rails.

The aircraft floor, as just described, offers savings in weight of around 10% to 20% compared to a traditional metal-design floor. It offers savings in thickness on the height of the rails, i.e., from 80 to 100 mm. This boxed-structure floor has the advantage of further comprising good rigidity while being lower than a traditional metal floor. It thus makes it possible to gain space in the cabin or bay of the aircraft.

In addition, since the lower surface of this floor is continuous and uniform, the wiring system is easy to install under the floor. Due to the space gained from the height of the floor, it is not necessary for this system of wires to run into the floor thickness, which makes it simple to install and easy to replace the different wires.

The invention claimed is:

1. An aircraft having a floor that can be attached to a vertical frame structure of the aircraft, comprising:
   first and second longitudinal beams connected to the frame structure, the longitudinal beams being spaced apart from each other and arranged parallel to each other, each beam having an open side facing the other beam, and
   a boxed horizontal structure nested inside the open side of each longitudinal beam so that the longitudinal beams attach the boxed horizontal structure to the frame structure,
   the boxed horizontal structure including a plurality of horizontally extending boxes made of composite materials positioned side by side forming a continuous, uniform upper surface and lower surface, each of the boxes extending laterally from a first end nested inside the first longitudinal beam to a second end nested inside the second longitudinal beam, with the upper surface of the boxed horizontal structure covered with an upper skin and the lower surface covered with a lower skin.

2. The aircraft in claim 1, comprising fittings connecting the beam to the frame structure.

3. The aircraft in claim 2, wherein the fittings provide pivot connections between the boxed structure and the frame structure.

4. The aircraft in claim 2, wherein the fittings are made of a composite material.

5. The aircraft in claim 2, including vertical support rods extending downwardly from the lower surface of the boxed horizontal structure.

6. The aircraft in claim 1, wherein the longitudinal beam has a C-shaped profile.

7. The aircraft in claim 1, wherein the longitudinal beam is made of a composite material.

8. A process for manufacturing an aircraft according to claim 1, including the following operations:
   manufacturing boxes from composite materials,
   assembling the boxes side by side to form at least one continuous, uniform upper surface,
   applying an upper skin and a lower skin made of composite materials to the boxes,
   connecting the boxes and the upper and lower skins to form a boxed structure,
   arranging a first and second longitudinal beam spaced apart from each other and arranged parallel to each other, each beam having an open side facing the other beam,
   installing the boxed structure inside the open side of each longitudinal beam such that each of the boxes extend laterally from a first end nested inside the first longitudinal beam to a second end nested inside the second longitudinal beam,
   attaching longitudinal beams to the vertical frame structure of the aircraft.

9. A floor for an aircraft, comprising:
   first and second horizontal longitudinally extending beams spaced apart from each other and arranged parallel to each other, each beam having an open side facing the other beam, and
   a boxed horizontal structure nested inside the open side of each longitudinal beam such that the longitudinal beam supports the boxed horizontal structure,
   the boxed horizontal structure including a plurality of horizontally extending boxes made of composite materials positioned side by side forming a continuous, uniform upper surface and lower surface, each of the boxes extending laterally from a first end nested inside the first longitudinal beam to a second end nested inside the second longitudinal beam, with the upper surface of the boxed horizontal structure being covered with an upper skin and the lower surface covered with a lower skin.

10. The floor in claim 9, wherein each longitudinal beam has a C-shaped profile.

11. The floor in claim 9, wherein each longitudinal beam is made of a composite material.

* * * * *